(12) United States Patent
Suzuki et al.

(10) Patent No.: US 9,539,871 B2
(45) Date of Patent: Jan. 10, 2017

(54) VEHICLE

(71) Applicant: YAMAHA HATSUDOKI KABUSHIKI KAISHA, Iwata-shi, Shizuoka (JP)

(72) Inventors: Yasuhiro Suzuki, Shizuoka (JP); Masayuki Kubo, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/919,788

(22) Filed: Oct. 22, 2015

(65) Prior Publication Data

US 2016/0185171 A1 Jun. 30, 2016

(30) Foreign Application Priority Data

Dec. 25, 2014 (JP) ................................. 2014-261978

(51) Int. Cl.

| B60G 3/20 | (2006.01) |
|---|---|
| B60K 5/00 | (2006.01) |
| B60G 13/00 | (2006.01) |
| B60G 7/00 | (2006.01) |
| B62D 23/00 | (2006.01) |

(52) U.S. Cl.
CPC ................. *B60G 3/20* (2013.01); *B60G 7/001* (2013.01); *B60G 13/005* (2013.01); *B60K 5/00* (2013.01); *B62D 23/005* (2013.01); *B60K 2005/003* (2013.01)

(58) Field of Classification Search
CPC ......... B60G 7/001; B60G 13/005; B60K 5/00; B62D 21/11
USPC .......................................................... 280/291
See application file for complete search history.

(56) References Cited

U.S. PATENT DOCUMENTS

| 4,650,210 A * | 3/1987 | Hirose | B62D 61/08 180/215 |
|---|---|---|---|
| 4,657,271 A * | 4/1987 | Salmon | B62D 9/02 280/124.139 |
| 4,840,396 A * | 6/1989 | Kubo | B60G 3/202 280/124.143 |
| 4,973,082 A * | 11/1990 | Kincheloe | B60R 21/13 280/756 |
| 6,241,267 B1 * | 6/2001 | Dziadosz | B60G 3/28 280/124.134 |
| 6,695,329 B2 * | 2/2004 | Handa | B60G 3/18 180/908 |
| 6,827,361 B2 * | 12/2004 | Seki | B60G 3/20 180/210 |

(Continued)

*Primary Examiner* — J. Allen Shriver, II
*Assistant Examiner* — Brian Cassidy
(74) *Attorney, Agent, or Firm* — Keating and Bennett, LLP

(57) ABSTRACT

In a vehicle, a first left straight line, passing through a first left front connector and a first left rear connector connecting a left upper arm and a left auxiliary frame, inclines inward toward a widthwise center as the first left straight line extends rearward in a bottom view. A second left straight line, passing through a second left front connector and a second left rear connector connecting a left lower arm and a left main subframe, inclines inward toward the widthwise center as the second left straight line extends rearward in the bottom view. A central position between the first left front connector and first left rear connector in the front-rear direction is rearward relative to a central position between the second left front connector and second left rear connector in the front-rear direction.

15 Claims, 9 Drawing Sheets

(56) References Cited

U.S. PATENT DOCUMENTS

| | | | | |
|---|---|---|---|---|
| 7,461,851 B2 * | 12/2008 | Yamamura | B60G 3/20 180/311 |
| 7,810,835 B2 * | 10/2010 | Koch | B62D 63/062 280/124.135 |
| 7,954,835 B2 * | 6/2011 | Nakamura | B60G 3/20 280/124.135 |
| 8,047,557 B2 * | 11/2011 | Kobayashi | B62D 25/2009 280/124.134 |
| 8,328,235 B2 * | 12/2012 | Schneider | B60J 5/0487 280/748 |
| 8,376,078 B2 * | 2/2013 | Hiddema | A01C 23/008 180/209 |
| 8,382,130 B2 * | 2/2013 | Nakamura | B60G 3/20 280/124.135 |
| 8,444,160 B2 * | 5/2013 | Okamoto | B60G 3/20 280/124.135 |
| 8,757,662 B2 * | 6/2014 | Deschambault | B60R 21/13 280/756 |
| 8,827,028 B2 * | 9/2014 | Sunsdahl | B62D 21/183 180/292 |
| 8,998,216 B2 * | 4/2015 | Maeda | B60K 5/00 280/5.511 |
| 9,327,587 B2 * | 5/2016 | Spindler | B62D 23/005 |
| 9,346,492 B2 * | 5/2016 | Oshima | B60G 7/001 |
| 2001/0048207 A1 * | 12/2001 | Handa | B60G 3/18 280/124.135 |
| 2003/0000764 A1 * | 1/2003 | Seiki | B60K 17/22 180/376 |
| 2004/0129489 A1 * | 7/2004 | Brasseal | B62D 31/00 180/350 |
| 2006/0066069 A1 * | 3/2006 | Yanai | B62K 5/01 280/124.135 |
| 2012/0031688 A1 * | 2/2012 | Safranski | B60G 3/14 180/54.1 |
| 2012/0193163 A1 * | 8/2012 | Wimpfheimer | B60G 3/20 180/233 |
| 2012/0223500 A1 | 9/2012 | Kinsman et al. | |
| 2013/0249182 A1 * | 9/2013 | Moessinger | B60G 7/008 280/124.135 |
| 2015/0061275 A1 * | 3/2015 | Deckard | B60G 21/055 280/788 |

* cited by examiner

VEHICLE

This application claims priority to Patent Application No. 2014-261978 filed in Japan on Dec. 25, 2014, the entire contents of which are hereby incorporated by reference.

BACKGROUND OF THE INVENTION

1. Field of the Invention

The present invention relates to vehicles suitable for traveling over rough terrain.

2. Description of the Related Art

Vehicles suitable for traveling over rough terrain are conventionally known. Included among such vehicles are an all-terrain vehicle (ATV) and a recreational off-highway vehicle (ROV). For example, U.S. Pat. No. 7,461,851 B2 and U.S. Pat. No. 6,695,329 B2 each disclose an ROV including upper arms, lower arms, a body frame, rear wheels, and shock absorbers. The rear wheels are supported by the body frame via the upper and lower arms that are movable members. The shock absorbers are connected to the body frame and the lower arms.

In general, the larger the operating range or stroke of a shock absorber, the greater the shock-absorbing performance of the shock absorber. The operating range of a shock absorber varies depending on arm lengths of upper and lower arms measured in the width direction of a vehicle. As used herein, the term "arm length" refers to a distance between a connection of an upper or lower arm with a body frame, and a connection of this arm with a wheel. This means that the longer the arm lengths, the larger the operating range of a shock absorber.

The ROV disclosed in each of U.S. Pat. No. 7,461,851 B2 and U.S. Pat. No. 6,695,329 B2 includes the upper and lower arms connected to the body frame extending in the front-rear direction of the vehicle. A possible approach to increasing the arm length in such a structure is to dispose the wheel farther outward in the width direction of the vehicle. Unfortunately, such an approach results in an increase in the widthwise length of the vehicle. Another possible approach is to dispose the connections of the upper and lower arms further inward in the width direction of the vehicle. However, components, such as an engine, are disposed inward of the upper and lower arms in the width direction of the vehicle. This makes it difficult to dispose the connections of the upper and lower arms, which are movable members, farther inward in the width direction of the vehicle.

As a possible solution to these problems, U.S. 2012/0223500 A1 discloses a vehicle including forward connections and rearward connections through which the upper and lower arms are connected to the body frame, with the rearward connections disposed inward of the forward connections in the width direction of the vehicle. This arrangement makes it possible to increase arm lengths without having to increase the widthwise length of the vehicle.

However, in the vehicle of U.S. 2012/0223500 A1, the connections between the upper arms and the body frame and the connections between the lower arms and the body frame are located at substantially the same positions in a plan view of the vehicle. Thus, the body frame must be arranged so that the connections between the upper arms and the body frame and the connections between the lower arms and the body frame are substantially aligned along the up-down direction of the vehicle. As a result, the upper and lower arms have limited flexibility in terms of mounting positions thereof.

SUMMARY OF THE INVENTION

Accordingly, preferred embodiments of the present invention provide a vehicle that includes upper and lower arms having long arm lengths without an increase in the widthwise length of the vehicle, and enables the upper and lower arms to have increased flexibility in terms of mounting positions thereof.

A vehicle according to a preferred embodiment of the present invention includes a body frame, at least one rear wheel, at least one upper arm, at least one lower arm, at least one shock absorber, at least one first front connector, at least one first rear connector, at least one second front connector, and at least one second rear connector. The upper arm is connected to the body frame. The upper arm supports the rear wheel. The lower arm is disposed lower than the upper arm and connected to the body frame. The lower arm supports the rear wheel. The shock absorber is connected to the body frame and to the lower arm or the upper arm. The first front connector connects the upper arm and the body frame to each other. The first rear connector is disposed rearward relative to the first front connector, and inward relative to the first front connector in a width direction of the vehicle. The first rear connector connects the upper arm and the body frame to each other. The second front connector connects the lower arm and the body frame to each other. The second rear connector is disposed rearward relative to the second front connector, and inward relative to the second front connector in the width direction of the vehicle. The second rear connector connects the lower arm and the body frame to each other. A first straight line passing through the first front connector and the first rear connector inclines inward toward a widthwise center of the vehicle as the first straight line extends rearward in a bottom view of the vehicle. A second straight line passing through the second front connector and the second rear connector inclines inward toward the widthwise center of the vehicle as the second straight line extends rearward in the bottom view of the vehicle. A central position between the first front connector and the first rear connector in a front-rear direction of the vehicle is located rearward relative to a central position between the second front connector and the second rear connector in the front-rear direction of the vehicle.

The vehicle according to the preferred embodiment of the present invention described above is configured so that the first straight line, passing through the first front connector and the first rear connector, inclines inward toward the widthwise center of the vehicle as the first straight line extends toward the rear of the vehicle, and the second straight line, passing through the second front connector and the second rear connector, inclines inward toward the widthwise center of the vehicle as the second straight line extends toward the rear of the vehicle. This makes it possible to increase arm lengths of the upper and lower arms measured in the width direction of the vehicle, without having to increase the widthwise length of the vehicle. Consequently, the shock absorber has a longer stroke and thus offers enhanced shock-absorbing performance. Because the first and second straight lines incline inward toward the widthwise center of the vehicle as they extend rearward, the first front connector is disposed outward relative to the first rear connector in the width direction of the vehicle, and the second front connector is disposed outward relative to the second rear connector in the width direction of the vehicle. This arrangement increases the layout flexibility of, for example, an engine at least partially located inward of the first front connector and the second front connector in the width direction of the vehicle. In contrast, if the first and second straight lines incline outward away from the widthwise center of the vehicle as they extend rearward, the first front connector and the second front connector must be disposed inward in the width direction of the vehicle so as not to increase the widthwise length of the vehicle, which makes it difficult to perform the layout of, for example, the engine at least partially disposed inward of the first front connector and the second front connector in the width direction of the vehicle. According to a preferred embodiment of the present invention, the central position between the first front connector and the first rear connector in the front-rear direction of the vehicle is located rearward relative to the central position between the second front connector and the second rear connector in the front-rear direction of the vehicle. This increases the layout flexibility of the connectors, thus increasing the flexibility of mounting positions of the upper and lower arms. Note that in order to prevent interference between the upper arm and the shock absorber and between the upper arm and an exhaust pipe extending from the engine, limitations are imposed on the arrangement of the first front connector and the first rear connector, which connect the upper arm and the body frame to each other. If an attempt is made to dispose the first front connector and the second front connector at the same position in a plan view, and dispose the first rear connector and the second rear connector at the same position in the plan view, limitations are also imposed on the arrangement of the second front connector and the second rear connector, which connect the lower arm and the body frame to each other.

Various preferred embodiments of the present invention provide a vehicle that includes upper and lower arms with long arm lengths and without an increase in widthwise length of the vehicle, and enables the upper and lower arms to have increased flexibility in terms of mounting positions thereof.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
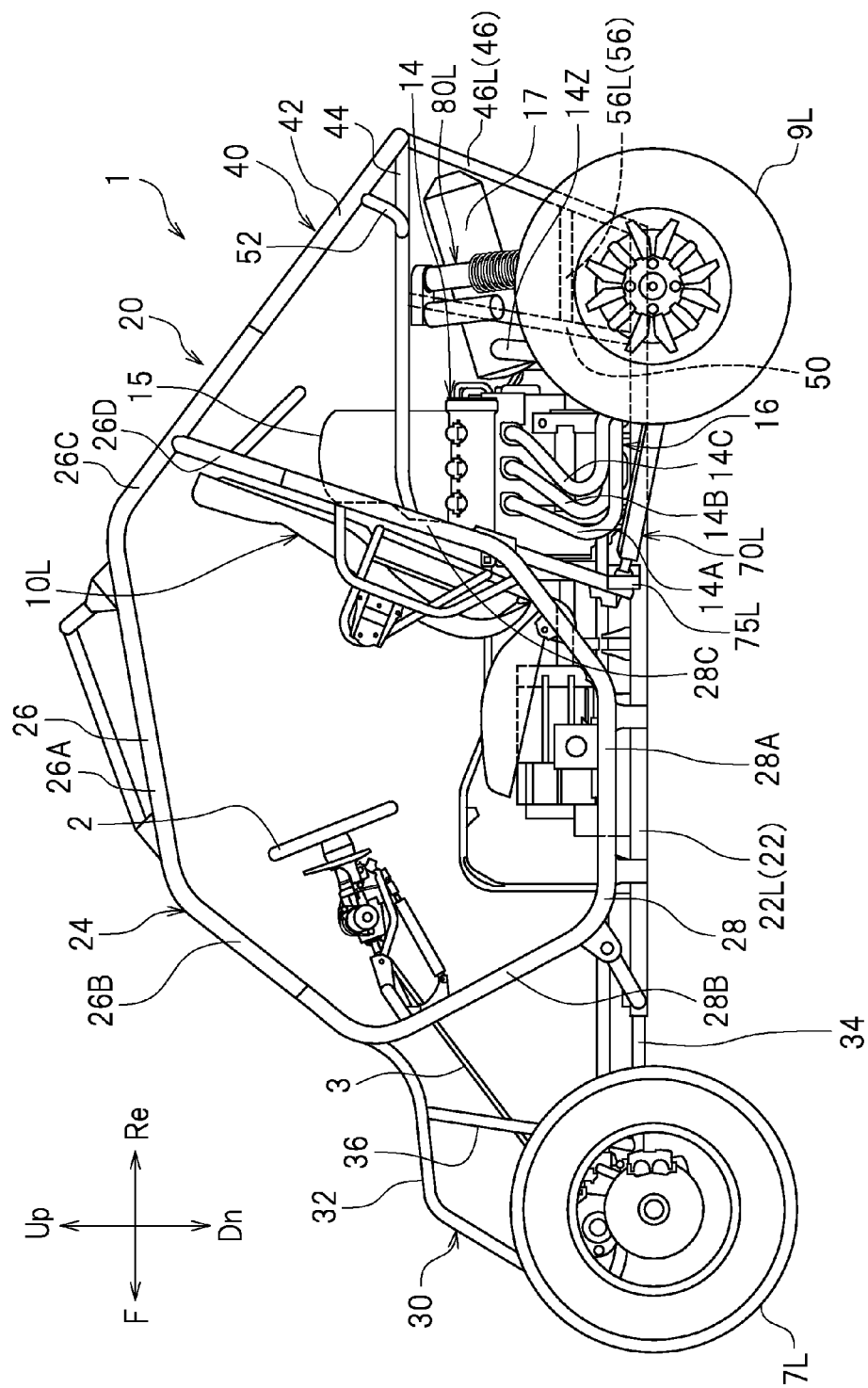
FIG. 1 is a left side view of an ROV according to a preferred embodiment of the present invention.

Hereinafter, preferred embodiments of the present invention will be described. As illustrated in FIG. 1, a vehicle according to the present preferred embodiment is, for example, a recreational off-highway vehicle (ROV) 1. The ROV 1 is suitable for traveling over rough terrain. The vehicle according to the preferred embodiments of the present invention is not limited to an ROV, but may be an all-terrain vehicle (ATV) or other suitable vehicle, for example.

Unless otherwise noted, the terms "front", "rear", "right", "left", "up", and "down" respectively refer to front, rear, right, left, up, and down with respect to a driver sitting on a left seat 10L of the ROV 1 in the following description. The terms "up" and "down" respectively refer to the vertically upward direction and the vertically downward direction when the ROV 1 is stationary on a horizontal plane. Reference signs "F", "Re", "R", "L", "Up", and "Dn" in the drawings respectively represent front, rear, right, left, up, and down.

As illustrated in FIG. 1, the ROV 1 preferably includes a body frame 20. The body frame 20 preferably is a pipe frame made of pipes. The body frame 20 preferably includes a main frame (lower frame) 22 extending in the front-rear direction of the vehicle, a center frame 24 disposed higher than the main frame 22, a front frame 30 disposed in front of the center frame 24, and a rear frame 40 disposed behind the center frame 24.

The center frame 24 preferably includes a first center subframe 26 and a second center subframe 28. The first center subframe 26 is disposed above the second center subframe 28. The first center subframe 26 is connected to the second center subframe 28. The first center subframe 26 preferably includes a first portion 26A extending in the front-rear direction or substantially in the front-rear direction of the vehicle, a second portion 26B extending obliquely downward and forward from the front end of the first portion 26A, a third portion 26C extending obliquely downward and rearward from the rear end of the first portion 26A, and a fourth portion 26D extending obliquely downward and forward from a location somewhere along the third portion 26C. The second center subframe 28 is disposed higher than the main frame 22. The second center subframe 28 is connected to the main frame 22. The second center subframe 28 preferably includes a first portion 28A extending in the front-rear direction or substantially in the front-rear direction of the vehicle, a second portion 28B extending obliquely upward and forward from the front end of the first portion 28A, and a third portion 28C extending obliquely upward and rearward from the rear end of the first portion 28A. The first portion 28A is connected to the main frame 22. The second portion 28B of the second center subframe 28 is connected to the second portion 26B of the first center subframe 26. The third portion 28C of the second center subframe 28 is connected to the fourth portion 26D of the first center subframe 26. The center frame 24 is preferably symmetrical with respect to a vehicle center line C (see FIG. 2, for example).

As illustrated in FIG. 1, the front frame 30 preferably includes a first front subframe 32, a second front subframe 34, and a third front subframe 36. The first front subframe 32 is connected to the second portion 28B of the second center subframe 28. The third front subframe 36 extends downward from a location somewhere along the first front subframe 32. The third front subframe 36 is connected to a location somewhere along the second front subframe 34. The second front subframe 34 extends in the front-rear direction of the vehicle. The front end of the second front subframe 34 is connected to the first front subframe 32. The rear end of the second front subframe 34 is connected to the main frame 22. The front frame 30 is preferably symmetrical with respect to the vehicle center line C (see FIG. 2, for example).

As illustrated in FIG. 1, the rear frame 40 preferably includes a first rear subframe (upper frame) 42, a second rear subframe 44, a first connection subframe (connection frame) 46, a second connection subframe 50, a third connection subframe 52, and an arm connector 56. The rear frame 40 is preferably symmetrical with respect to the vehicle center line C (see FIG. 2, for example).

Figure 2:
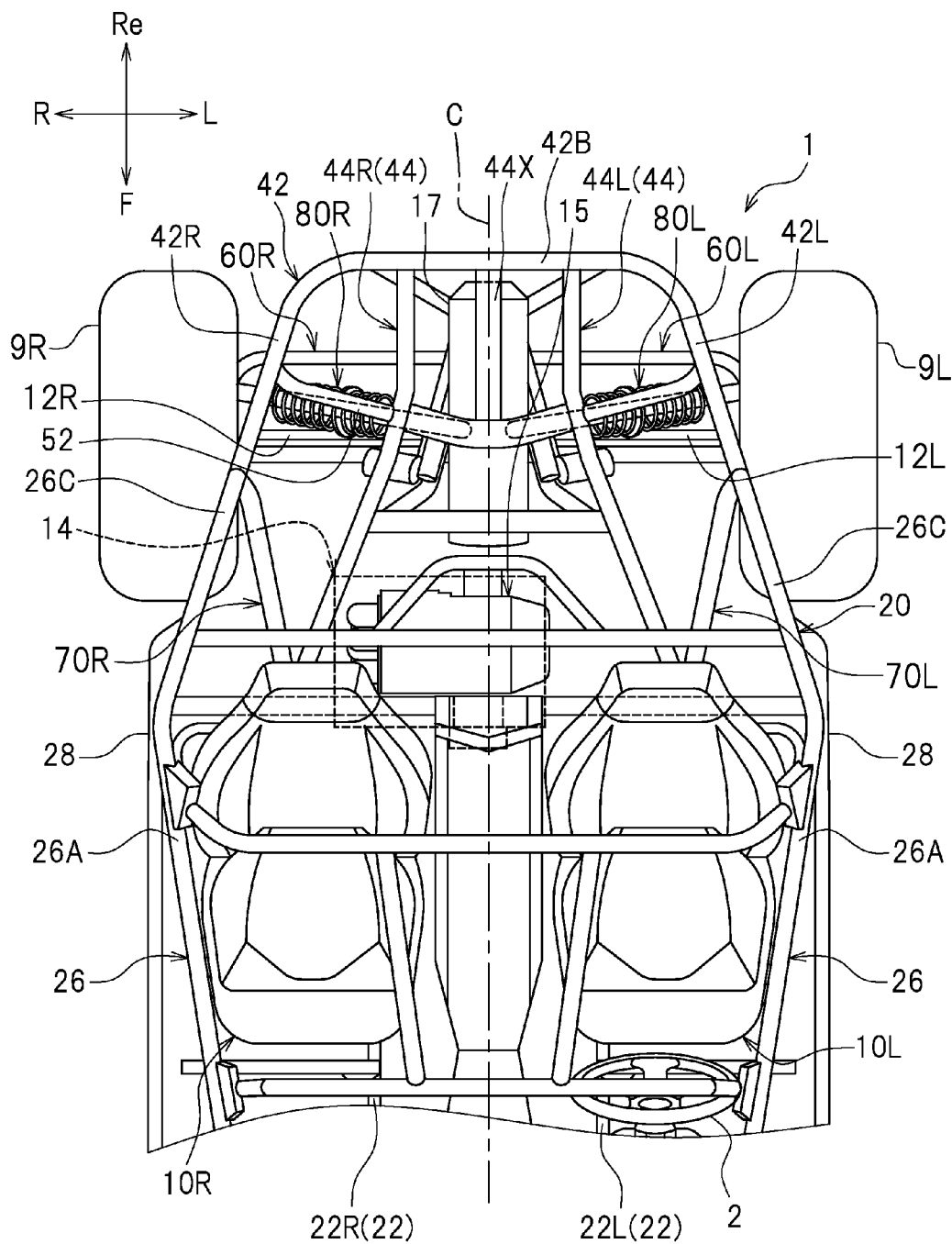
FIG. 2 is a partial plan view of an ROV according to a preferred embodiment of the present invention.

The first rear subframe 42 extends obliquely downward and rearward from the third portion 26C of the first center subframe 26. As illustrated in FIG. 2, the first rear subframe 42 preferably includes a left lateral portion 42L extending obliquely rightward and rearward from the left third portion 26C, a right lateral portion 42R extending obliquely leftward and rearward from the right third portion 26C, and a rear portion 42B extending in the width direction of the vehicle and connecting the right and left lateral portions 42R and 42L to each other.

Figure 3:
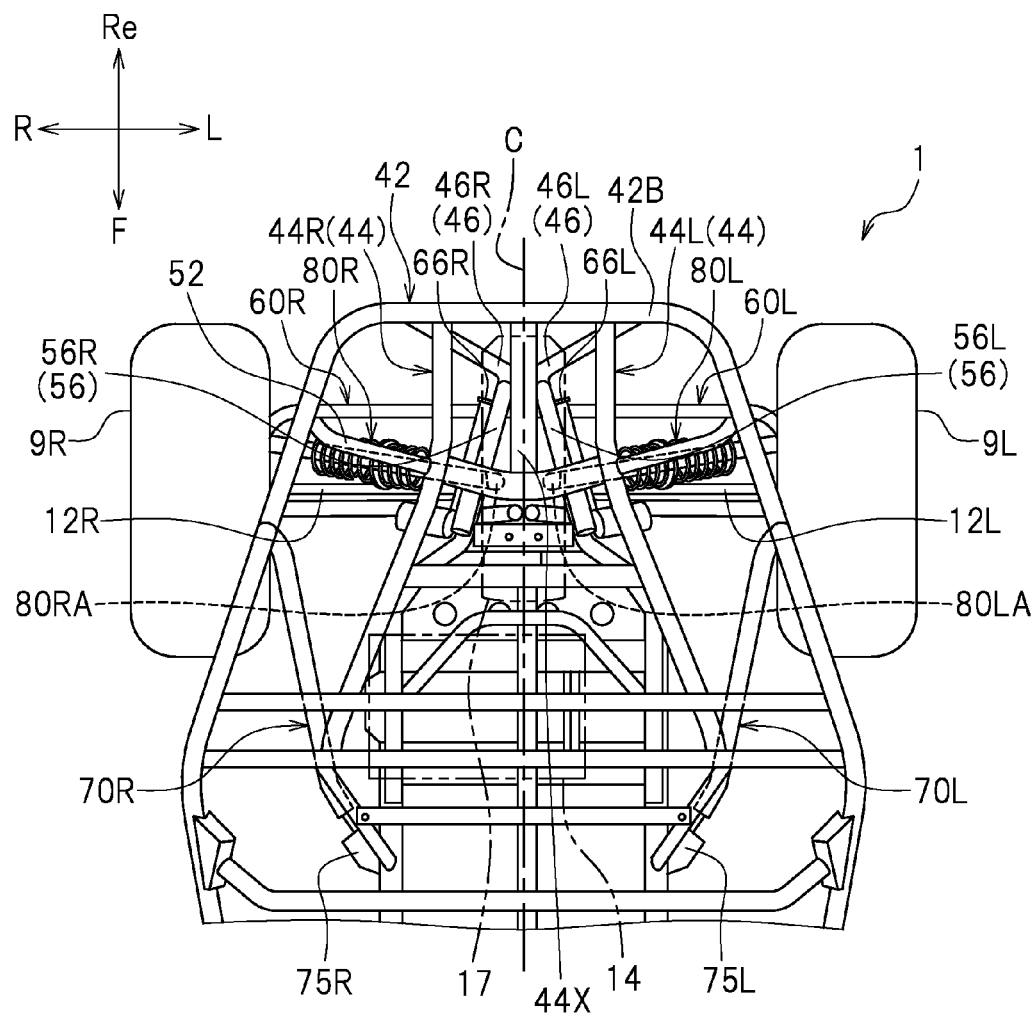
FIG. 3 is a plan view of an ROV according to a preferred embodiment of the present invention, illustrating main components in the rear portion of the ROV.

As illustrated in FIG. 1, the second rear subframe 44 extends rearward from a location somewhere along the third portion 28C of the second center subframe 28. As illustrated in FIG. 3, the second rear subframe 44 extends forward from the first rear subframe 42. The second rear subframe 44 is connected to the rear portion 42B of the first rear subframe 42. As illustrated in FIG. 1, the second rear subframe 44 is connected to the first rear subframe 42, and to the third portion 28C of the second center subframe 28.

As illustrated in FIG. 1, the first connection subframe 46 extends obliquely downward and forward from the rear end of the first rear subframe 42. The first connection subframe 46 extends obliquely upward and rearward from the rear end of the main frame 22. The first connection subframe 46 is disposed rearward relative to the second connection subframe 50. The first connection subframe 46 is connected to the first rear subframe 42 and the main frame 22. The first connection subframe 46 is disposed rearward relative to an engine 14 (which will be described below). The second connection subframe 50 extends obliquely downward and forward from a location somewhere along the second rear subframe 44. The second connection subframe 50 is connected to the main frame 22. The second connection subframe 50 is disposed forward relative to the third connection subframe 52. The third connection subframe 52 extends obliquely downward and forward from a location somewhere along the first rear subframe 42. The third connection subframe 52 is connected to locations somewhere along the second rear subframe 44.

Figure 4:
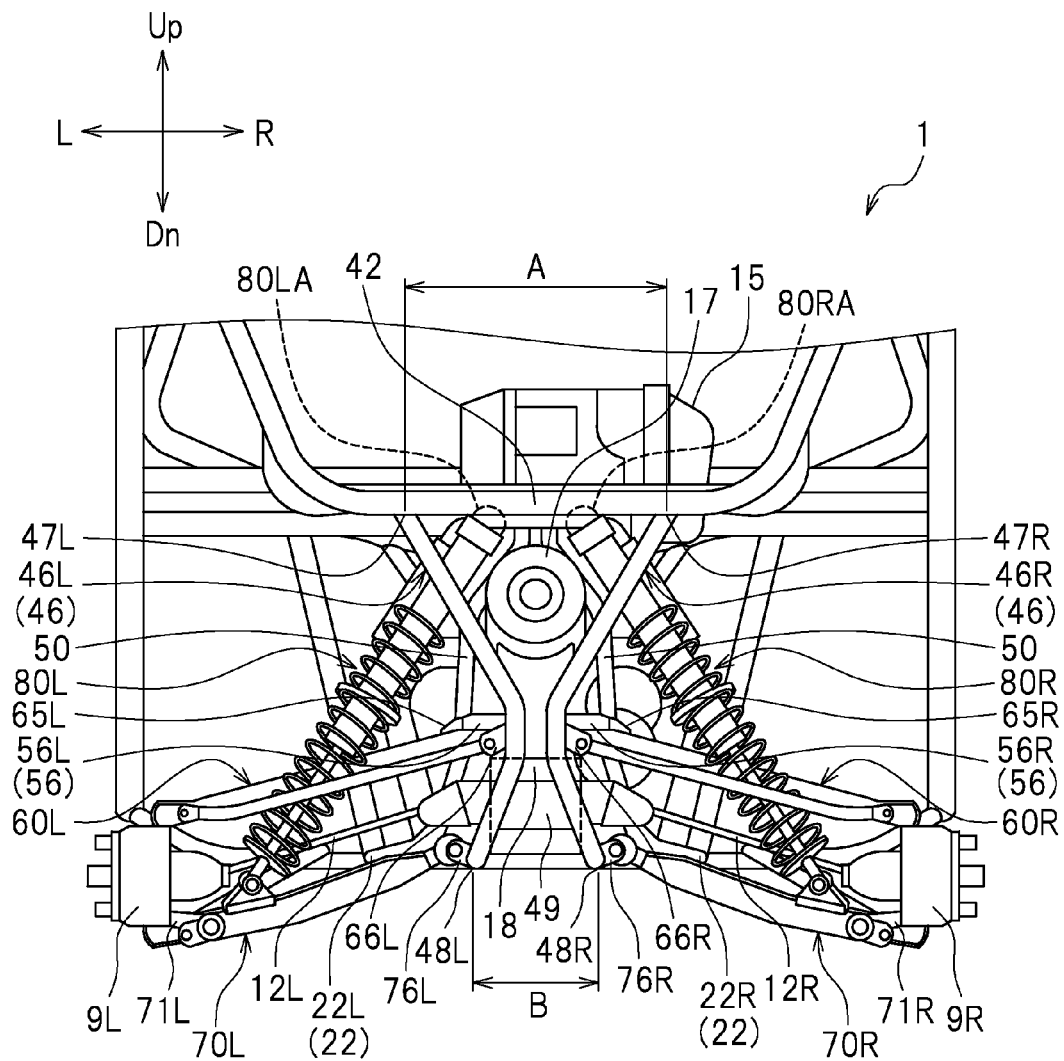
FIG. 4 is a rear view of an ROV according to a preferred embodiment of the present invention, illustrating the main components thereof.

As illustrated in FIG. 4, the first connection subframe 46 preferably includes a left pipe frame portion 46L and a right pipe frame portion 46R. The left pipe frame portion 46L is connected to the first rear subframe 42 and a left main subframe 22L (which will be described below). The right pipe frame portion 46R is connected to the first rear subframe 42 and a right main subframe 22R (which will be described below). The first connection subframe 46 does not necessarily have to include the right and left pipe frame portions 46R and 46L separate from each other. For example, the first connection subframe 46 may alternatively include a plate frame in which the right and left pipe frame portions 46R and 46L are preferably are integral and unitary with each other. In FIG. 4, the tires of a right rear wheel 9R and a left rear wheel 9L (which will be described below) are not illustrated for the sake of convenience.

Figure 5:
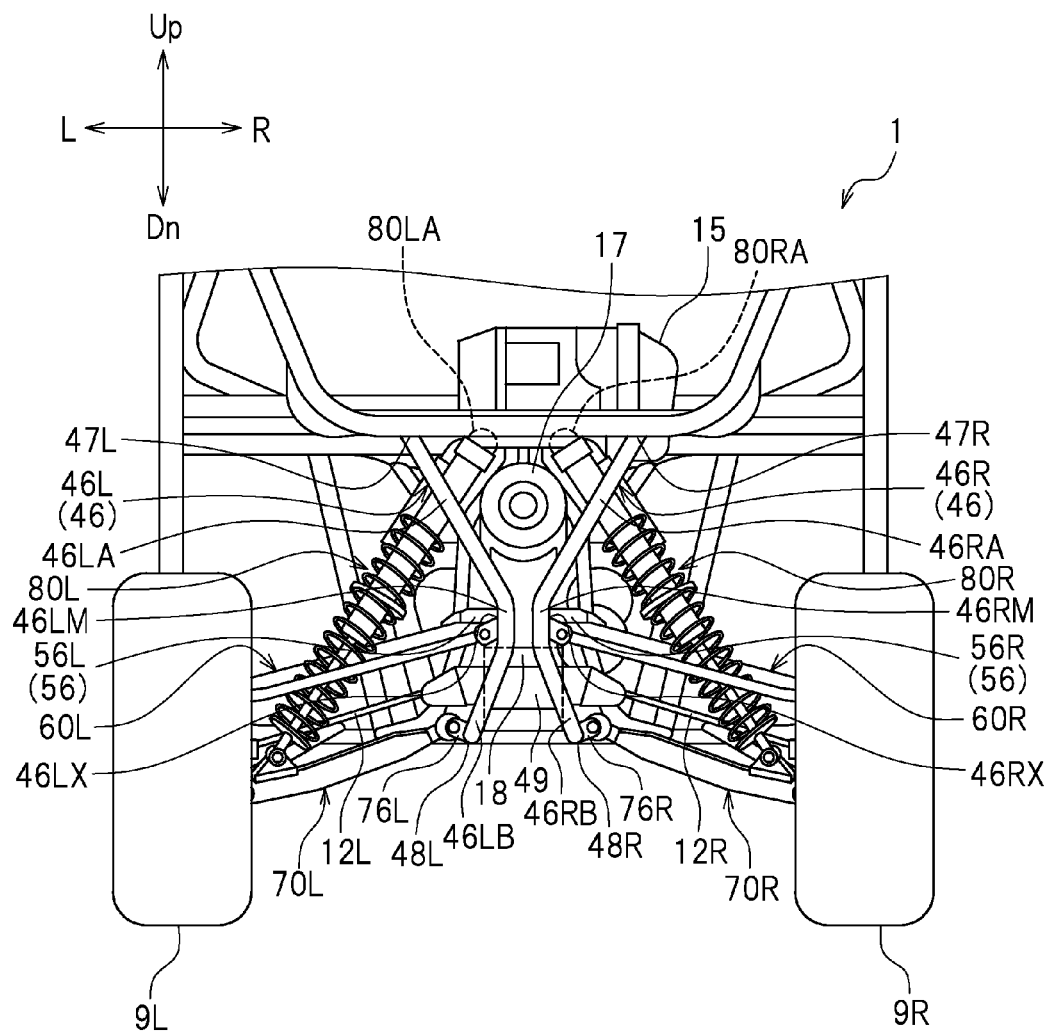
FIG. 5 is a rear view of an ROV according to a preferred embodiment of the present invention, illustrating the main components thereof.

As illustrated in FIG. 5, the left pipe frame portion 46L preferably includes a first section 46LA, an intermediate section 46LM, and a second section 46LB. The second section 46LB is located lower than the first section 46LA. The intermediate section 46LM is located under the first section 46LA and on the second section 46LB. The intermediate section 46LM connects the first and second sections 46LA and 46LB to each other. The first section 46LA inclines inward toward the widthwise center of the vehicle as it extends downward. In other words, the first section 46LA inclines rightward as it extends downward. The intermediate section 46LM extends in the up-down direction. The second section 46LB inclines outward away from the widthwise center of the vehicle as it extends downward. In other words, the second section 46LB extends leftward as it extends downward. The right pipe frame portion 46R preferably includes a first section 46RA, an intermediate section 46RM, and a second section 46RB. The second section 46RB is located lower than the first section 46RA. The intermediate section 46RM is located under the first section 46RA and on the second section 46RB. The intermediate section 46RM connects the first and second sections 46RA and 46RB to each other. The first section 46RA inclines inward toward the widthwise center of the vehicle as it extends downward. In other words, the first section 46RA inclines leftward as it extends downward. The intermediate section 46RM extends in the up-down direction. The second section 46RB inclines outward away from the widthwise center of the vehicle as it extends downward. In other words, the second section 46RB inclines rightward as it extends downward. The second section 46LB may alternatively extend downward from the lower end of the first section 46LA and incline outward away from the widthwise center of the vehicle as the second section 46LB extends downward. In that case, the intermediate section 46LM is a connection point between the first and second sections 46LA and 46LB. The second section 46RB may alternatively extend downward from the lower end of the first section 46RA and incline outward away from the widthwise center of the vehicle as the second section 46RB extends downward. In that case, the intermediate section 46RM is a connection point between the first and second sections 46RA and 46RB.

Figure 6:
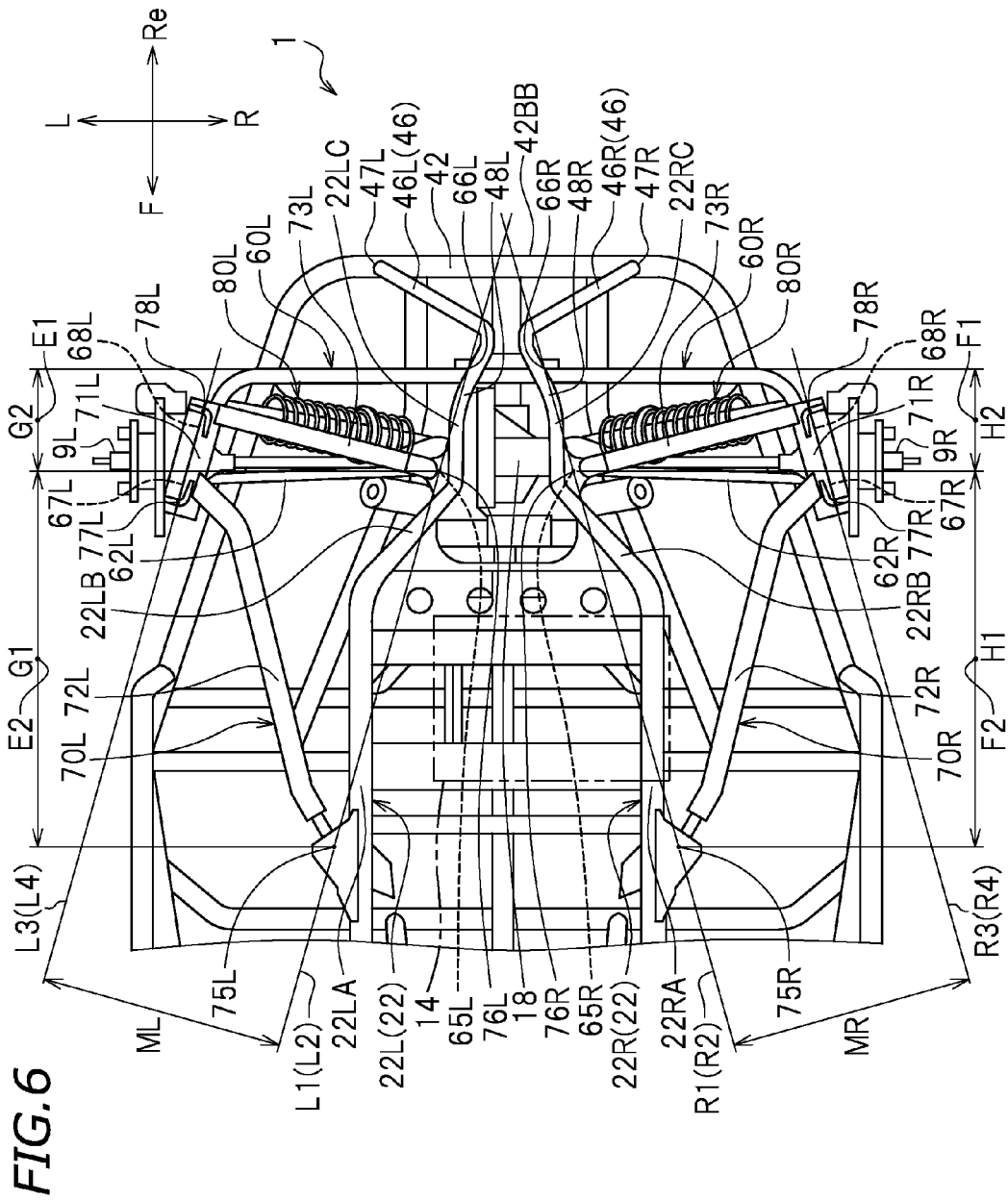
FIG. 6 is a bottom view of an ROV according to a preferred embodiment of the present invention, illustrating the main components in the rear portion of the ROV.

As illustrated in FIG. 4, the first rear subframe 42 preferably further includes a first upper connection 47L (see also FIG. 6) and a second upper connection 47R (see also FIG. 6). The main frame 22 preferably includes a first lower connection 48L (see also FIG. 6), and a second lower connection 48R (see also FIG. 6). The second upper connection 47R is disposed rightward relative to the first upper connection 47L. The second lower connection 48R is disposed rightward relative to the first lower connection 48L. The first lower connection 48L is disposed rightward relative to the first upper connection 47L. The second lower connection 48R is disposed leftward relative to the second upper connection 47R. As illustrated in FIG. 6, the first and second lower connections 48L and 48R are located forward relative to a rear end 42BB of the first rear subframe 42. In FIG. 6, the tires of the right and left rear wheels 9R and 9L (which will be described below) are not illustrated for the sake of convenience.

As illustrated in FIG. 4, the first upper connection 47L connects the first rear subframe 42 and the first connection subframe 46 to each other. More specifically, the first upper connection 47L connects the first rear subframe 42 and the left pipe frame portion 46L to each other. The second upper connection 47R connects the first rear subframe 42 and the first connection subframe 46 to each other. More specifically, the second upper connection 47R connects the first rear subframe 42 and the right pipe frame portion 46R to each other. The first lower connection 48L connects the main frame 22 and the first connection subframe 46 to each other. More specifically, the first lower connection 48L connects the left main subframe 22L and the left pipe frame portion 46L to each other. The second lower connection 48R connects the main frame 22 and the first connection subframe 46 to each other. More specifically, the second lower connection 48R connects the right main subframe 22R and the right pipe frame portion 46R to each other. In the present preferred embodiment, the first and second lower connections 48L and 48R define connection points between the main frame 22 extending in the front-rear direction, and the first connection subframe 46 (i.e., the right and left pipe frame portions 46R and 46L) extending in the up-down direction. Although the main frame 22 and the first connection subframe 46 are preferably integral and unitary with each other in the present preferred embodiment, the main frame 22 and the first connection subframe 46 may alternatively be separate components.

As illustrated in FIG. 4, a distance A between the first upper connection 47L and the second upper connection 47R is longer than a distance B between the first lower connection 48L and the second lower connection 48R. As illustrated in FIG. 6, the first upper connection 47L is disposed rearward relative to the first lower connection 48L. The second upper connection 47R is disposed rearward relative to the second lower connection 48R.

As illustrated in FIG. 5, the first connection subframe 46 preferably further includes a cross member 49. The cross member 49 is disposed between the left pipe frame portion 46L and the right pipe frame portion 46R. The cross member 49 is connected to the left pipe frame portion 46L and the right pipe frame portion 46R. More specifically, the cross member 49 is connected to the second section 46LB of the left pipe frame portion 46L, and to the second section 46RB of the right pipe frame portion 46R. The cross member 49 according to the present preferred embodiment is preferably plate-shaped, but may alternatively be pipe-shaped, for example.

Figure 7:
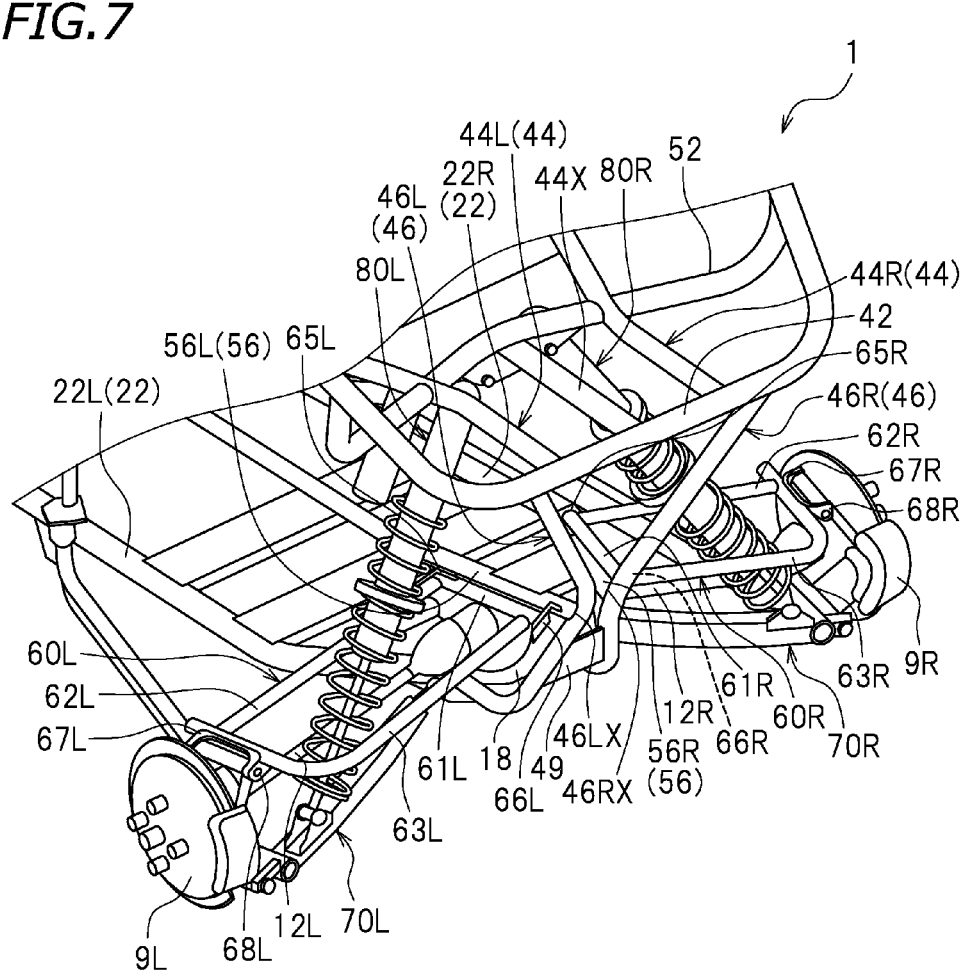
FIG. 7 is a perspective view of an ROV according to a preferred embodiment of the present invention, illustrating the main components thereof.

As illustrated in FIG. 7, the second rear subframe 44 is disposed higher than the arm connector 56. As illustrated in FIG. 3, the second rear subframe 44 preferably includes a first auxiliary frame portion (upper auxiliary frame) 44L and a second auxiliary frame portion (upper auxiliary frame) 44R. The first and second auxiliary frame portions 44L and 44R are preferably pipe frames. The first and second auxiliary frame portions 44L and 44R are connected to the third connection subframe 52. Disposed between the first and second auxiliary frame portions 44L and 44R is a third auxiliary frame portion 44X. The third auxiliary frame portion 44X is connected to the third connection subframe 52, and to the rear portion 42B of the first rear subframe 42. In FIG. 7, the tires of the right and left rear wheels 9R and 9L are not illustrated for the sake of convenience.

As illustrated in FIG. 3, the arm connector 56 is disposed rightward of a left upper arm 60L (which will be described below). The arm connector 56 is disposed leftward of a right upper arm 60R (which will be described below). The arm connector 56 supports the right and left upper arms 60R and 60L.

As illustrated in FIG. 3, the arm connector 56 preferably includes a left auxiliary frame 56L and a right auxiliary frame 56R. The right and left auxiliary frames 56R and 56L are preferably pipe frames. The left auxiliary frame 56L extends obliquely leftward and forward from the left pipe frame portion 46L (see also FIG. 4). The right auxiliary frame 56R extends obliquely rightward and forward from the right pipe frame portion 46R (see also FIG. 4). As illustrated in FIG. 5, the left auxiliary frame 56L extends forward from between the first and second sections 46LA and 46LB of the left pipe frame portion 46L. In other words, the left auxiliary frame 56L extends forward from the intermediate section 46LM of the left pipe frame portion 46L. The right auxiliary frame 56R extends forward from between the first and second sections 46RA and 46RB of the right pipe frame portion 46R. In other words, the right auxiliary frame 56R extends forward from the intermediate section 46RM of the right pipe frame portion 46R. A connection 46LX (see also FIG. 7) between the left auxiliary frame 56L and the left pipe frame portion 46L is disposed rightward relative to the first lower connection 48L, and leftward relative to the second lower connection 48R. A connection 46RX (see also FIG. 7) between the right auxiliary frame 56R and the right pipe frame portion 46R is disposed rightward relative to the first lower connection 48L, and leftward relative to the second lower connection 48R. Although the arm connector 56 preferably includes two frames, i.e., the right and left auxiliary frames 56R and 56L, in the present preferred embodiment, the arm connector 56 may alternatively be a single, unitary frame, for example. In one example, the arm connector 56 may be a bracket extending upward from the main frame 22. In another example, the arm connector 56 may be a bracket provided on the second connection subframe 50.

As illustrated in FIG. 6, the main frame 22 preferably includes the left main subframe 22L and the right main subframe 22R. The right and left main subframes 22R and 22L are preferably pipe frames. The left main subframe 22L preferably includes a first portion 22LA, a second portion 22LB, and a third portion 22LC. The first portion 22LA extends in the front-rear direction of the vehicle. The second portion 22LB extends rearward from the first portion 22LA and inward toward the widthwise center of the vehicle so as to connect the first portion 22LA and the third portion 22LC to each other. In other words, the second portion 22LB extends rearward and rightward from the first portion 22LA. The third portion 22LC extends rearward from the second portion 22LB. The rear end of the third portion 22LC is connected to the left pipe frame portion 46L. The right main subframe 22R preferably includes a first portion 22RA, a second portion 22RB, and a third portion 22RC. The first portion 22RA extends in the front-rear direction of the vehicle. The second portion 22RB extends rearward from the first portion 22RA and inward toward the widthwise center of the vehicle so as to connect the first portion 22RA and the third portion 22RC to each other. In other words, the second portion 22RB extends rearward and leftward from the first portion 22RA. The third portion 22RC extends rearward from the second portion 22RB. The rear end of the third portion 22RC is connected to the right pipe frame portion 46R.

As illustrated in FIG. 1, the ROV 1 preferably further includes a steering wheel 2. Attached to the steering wheel 2 is a steering shaft 3. The ROV 1 preferably includes a left front wheel 7L, a right front wheel (not illustrated), the left rear wheel 9L, and the right rear wheel 9R (see FIG. 3). The left front wheel 7L and the right front wheel are connected to an axle (not illustrated) provided on the front frame 30. The left front wheel 7L and the right front wheel are controlled using the steering wheel 2. As illustrated in FIG. 3, the left rear wheel 9L is connected to a left axle 12L provided on the rear frame 40. The right rear wheel 9R is connected to a right axle 12R provided on the rear frame 40.

As illustrated in FIG. 2, the left seat 10L and right seat 10R are disposed rearward relative to the steering wheel 2 (see FIG. 1). The driver sits on the left seat 10L. An occupant sits on the right seat 10R. The left seat 10L is supported by the main frame 22. More specifically, the left seat 10L is supported by the left main subframe 22L. The right seat 10R is supported by the main frame 22. More specifically, the right seat 10R is supported by the right main subframe 22R. The left seat 10L is disposed behind the steering wheel 2. The right seat 10R is disposed rightward of the left seat 10L.

As illustrated in FIG. 1, the ROV 1 preferably includes the engine 14. The engine 14 is supported by the body frame 20. More specifically, the engine 14 is supported by the main frame 22. The engine 14 is disposed lower than the first rear subframe 42. As illustrated in FIG. 2, the engine 14 is disposed rearward relative to the right and left seats 10R and 10L. As illustrated in FIG. 6, the engine 14 is disposed forward relative to the third portion 22LC of the left main subframe 22L, and the third portion 22RC of the right main subframe 22R.

As illustrated in FIG. 1, the ROV 1 preferably further includes an air cleaner 15. The air cleaner 15 is disposed on the engine 14. The air cleaner 15 is connected to the engine 14. As illustrated in FIG. 2, the air cleaner 15 is disposed rearward relative to the right and left seats 10R and 10L.

As illustrated in FIG. 4, the ROV 1 preferably includes a final reduction gear 18, and the right and left axles 12R and 12L connected to the final reduction gear 18. As illustrated in FIG. 6, the final reduction gear 18 is disposed behind the engine 14. The final reduction gear 18 is disposed between the right and left upper arms 60R and 60L. The right and left axles 12R and 12L extend in the width direction of the vehicle or substantially in the width direction of the vehicle. The left axle 12L rotates upon receiving a driving force from the engine 14 via the final reduction gear 18. The right axle 12R rotates upon receiving a driving force from the engine 14 via the final reduction gear 18. As illustrated in FIG. 5, the left axle 12L is disposed below the left upper arm 60L and above a left lower arm 70L in a rear view of the vehicle. The right axle 12R is disposed below the right upper arm 60R and above a right lower arm 70R in the rear view of the vehicle.

Figure 8:
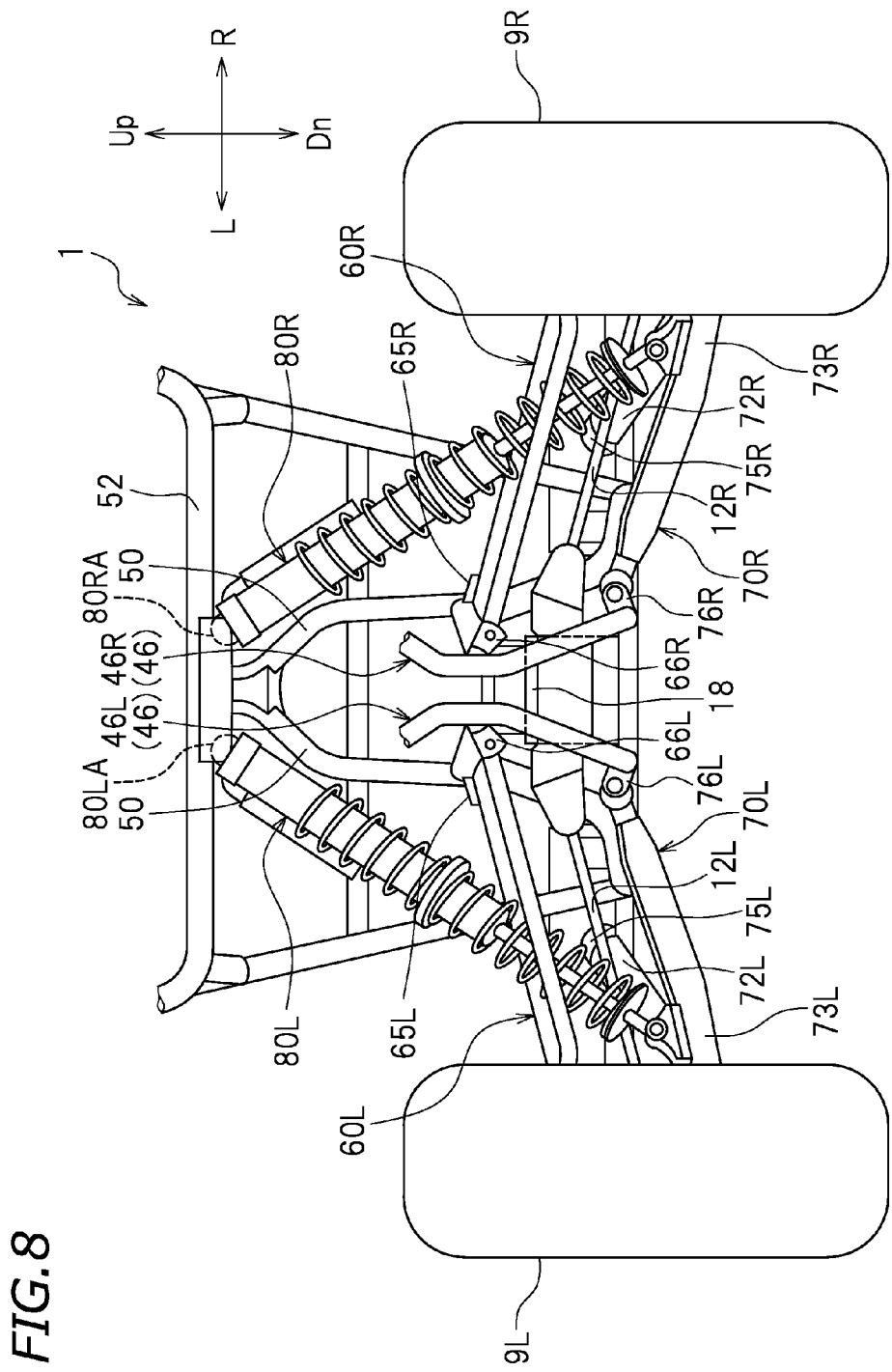
FIG. 8 is a rear view of an ROV according to a preferred embodiment of the present invention, illustrating the main components thereof.

As illustrated FIG. 3, the ROV 1 preferably includes the left upper arm 60L and the right upper arm 60R. The right and left upper arms 60R and 60L are disposed rearward relative to the engine 14. The left upper arm 60L supports the left rear wheel 9L. The right upper arm 60R supports the right rear wheel 9R. As illustrated in FIG. 8, the left upper arm 60L is disposed leftward relative to the first connection subframe 46. More specifically, the left upper arm 60L is disposed leftward relative to the left pipe frame portion 46L. The right upper arm 60R is disposed rightward relative to the first connection subframe 46. More specifically, the right upper arm 60R is disposed rightward relative to the right pipe frame portion 46R. In FIG. 8, the right and left pipe frame portions 46R and 46L are only partially illustrated, and the first rear subframe 42 is not illustrated for the sake of convenience.

As illustrated in FIG. 7, the left upper arm 60L preferably includes a first left upper frame 61L, a second left upper frame 62L, and a third left upper frame 63L. The first left upper frame 61L extends in the front-rear direction of the vehicle or substantially in the front-rear direction of the vehicle. The second left upper frame 62L extends leftward from the front portion of the first left upper frame 61L. The third left upper frame 63L extends leftward from the rear portion of the first left upper frame 61L, and then extends forward. The left end of the second left upper frame 62L is connected to the third left upper frame 63L. The second left upper frame 62L and the third left upper frame 63L are preferably U-shaped or substantially U-shaped.

As illustrated in FIG. 7, the right upper arm 60R preferably includes a first right upper frame 61R, a second right upper frame 62R, and a third right upper frame 63R. The first right upper frame 61R extends in the front-rear direction of the vehicle or substantially in the front-rear direction of the vehicle. The second right upper frame 62R extends rightward from the front portion of the first right upper frame 61R. The third right upper frame 63R extends rightward from the rear portion of the first right upper frame 61R, and then extends forward. The right end of the second right upper frame 62R is connected to the third right upper frame 63R. The second right upper frame 62R and the third right upper frame 63R are preferably U-shaped or substantially U-shaped.

As illustrated in FIG. 4, the ROV 1 preferably further includes a first left front connector 65L (see also FIG. 7), a first left rear connector 66L (see also FIG. 7), a first right front connector 65R (see also FIG. 7), and a first right rear connector 66R (see also FIG. 7). The first left front connector 65L and the first left rear connector 66L are brackets provided on the left auxiliary frame 56L. The first right front connector 65R and the first right rear connector 66R are brackets provided on the right auxiliary frame 56R. As illustrated in FIG. 7, the first left rear connector 66L is disposed rearward relative to the first left front connector 65L. The first right rear connector 66R is disposed rearward relative to the first right front connector 65R. The first left front connector 65L connects the left auxiliary frame 56L and the first left upper frame 61L of the left upper arm 60L to each other. The first left rear connector 66L connects the left auxiliary frame 56L and the first left upper frame 61L of the left upper arm 60L to each other. The left upper arm 60L is rotatable with respect to the left auxiliary frame 56L. The first right front connector 65R connects the right auxiliary frame 56R and the first right upper frame 61R of the right upper arm 60R to each other. The first right rear connector 66R (see also FIG. 4) connects the right auxiliary frame 56R and the first right upper frame 61R of the right upper arm 60R to each other. The right upper arm 60R is rotatable with respect to the right auxiliary frame 56R. As illustrated in FIG. 4, the first lower connection 48L is located leftward relative to the first left rear connector 66L in the rear view of the vehicle. The second lower connection 48R is located rightward relative to the first right rear connector 66R in the rear view of the vehicle. As illustrated in FIG. 6, the first left front connector 65L is located rearward relative to the engine 14. The first right front connector 65R is located rearward relative to the engine 14.

As illustrated in FIG. 6, a first left straight line L1 passes through the first left front connector 65L and the first left rear connector 66L. The first left straight line L1 inclines inward toward the widthwise center of the vehicle as it extends rearward in a bottom view of the vehicle. In other words, the first left straight line L1 inclines rightward as it extends rearward in the bottom view of the vehicle. A first right straight line R1 passes through the first right front connector 65R and the first right rear connector 66R. The first right straight line R1 inclines inward toward the widthwise center of the vehicle as it extends rearward in the bottom view of the vehicle. In other words, the first right straight line R1 inclines leftward as it extends rearward in the bottom view of the vehicle. The first left straight line L1 and the first right straight line R1 preferably intersect at a point rearward relative to the first rear subframe 42 in the bottom view of the vehicle.

As illustrated in FIG. 7, the ROV 1 preferably further includes a third left front connector 67L, a third left rear connector 68L, a third right front connector 67R, and a third right rear connector 68R. The third left rear connector 68L is disposed rearward relative to the third left front connector 67L. The third right rear connector 68R is disposed rearward relative to the third right front connector 67R. The third left front connector 67L connects the left rear wheel 9L and the third left upper frame 63L of the left upper arm 60L to each other. The third left rear connector 68L connects the left rear wheel 9L and the third left upper frame 63L of the left upper arm 60L to each other. The third right front connector 67R connects the right rear wheel 9R and the third right upper frame 63R of the right upper arm 60R to each other. The third right rear connector 68R connects the right rear wheel 9R and the third right upper frame 63R of the right upper arm 60R to each other.

As illustrated in FIG. 6, a third left straight line L3 passes through the third left front connector 67L and the third left rear connector 68L. The third left straight line L3 inclines inward toward the widthwise center of the vehicle as it extends rearward in the bottom view of the vehicle. In other words, the third left straight line L3 inclines rightward as it extends rearward in the bottom view of the vehicle. The third left straight line L3 is parallel or substantially parallel to the first left straight line L1. A third right straight line R3 passes through the third right front connector 67R and the third right rear connector 68R. The third right straight line R3 inclines inward toward the widthwise center of the vehicle as it extends rearward in the bottom view of the vehicle. In other words, the third right straight line R3 inclines leftward as it extends rearward in the bottom view of the vehicle. The third right straight line R3 is parallel or substantially parallel to the first right straight line R1.

As illustrated in FIG. 4, the ROV 1 preferably includes the left lower arm 70L and the right lower arm 70R. The left lower arm 70L is disposed lower than the left upper arm 60L. The right lower arm 70R is disposed lower than the right upper arm 60R. As illustrated in FIG. 5, the left lower arm 70L supports the left rear wheel 9L. The right lower arm 70R supports the right rear wheel 9R. The left lower arm 70L is disposed leftward relative to the first connection subframe 46. More specifically, the left lower arm 70L is disposed leftward relative to the left pipe frame portion 46L of the first connection subframe 46. The right lower arm 70R is disposed rightward relative to the first connection subframe 46. More specifically, the right lower arm 70R is disposed rightward relative to the right pipe frame portion 46R of the first connection subframe 46.

Figure 9:
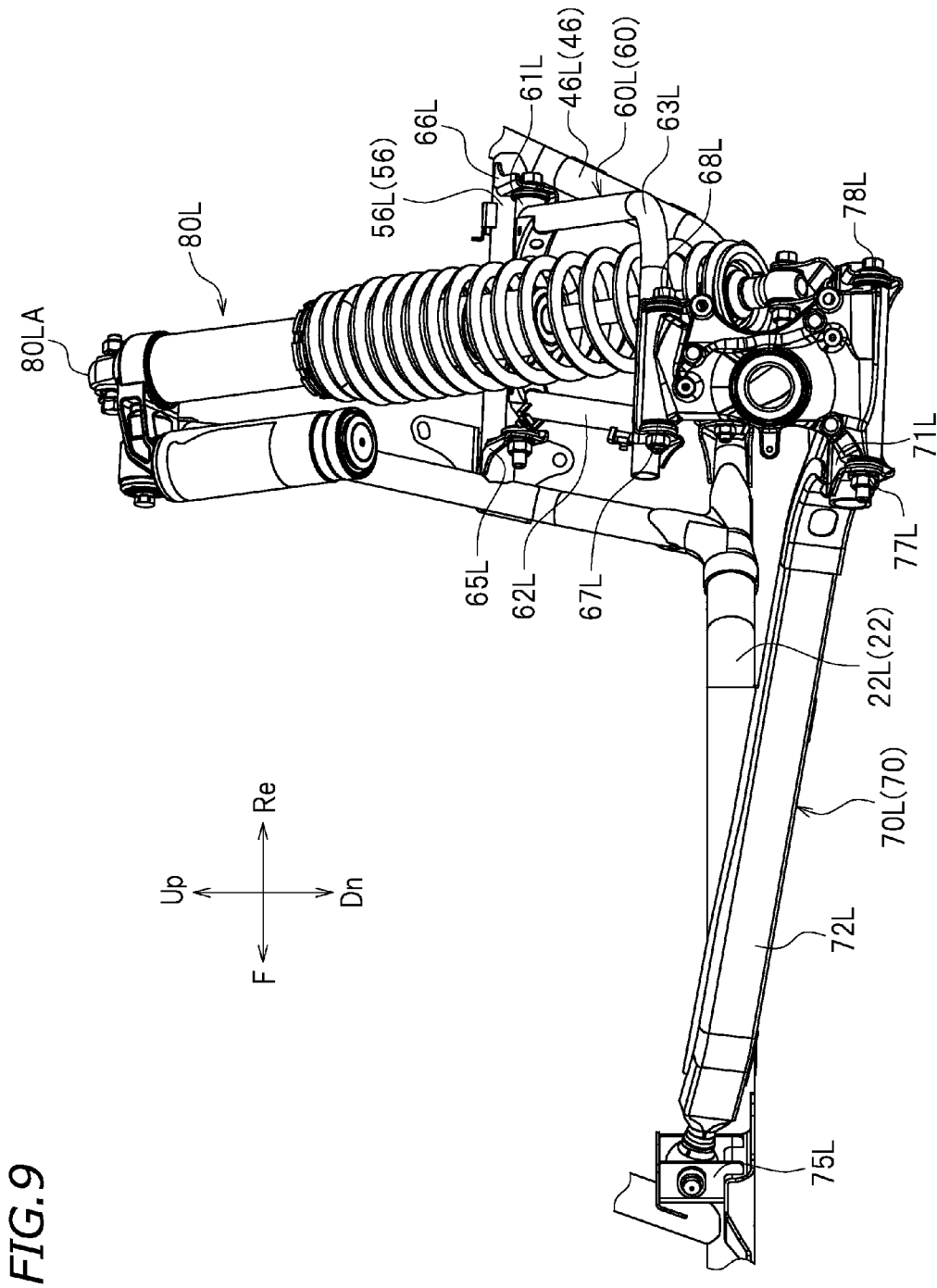
FIG. 9 is a left side view of an ROV according to a preferred embodiment of the present invention, illustrating the main components in the rear portion of the ROV.

As illustrated in FIG. 6, the left lower arm 70L preferably includes a first left lower frame 71L, a second left lower frame 72L, and a third left lower frame 73L. The first left lower frame 71L extends in the front-rear direction of the vehicle or substantially in the front-rear direction of the vehicle. The second left lower frame 72L extends obliquely rightward and forward from the front portion of the first left lower frame 71L. The third left lower frame 73L extends obliquely rightward and forward from the rear portion of the first left lower frame 71L. The second left lower frame 72L is disposed forward relative to the third left lower frame 73L. As illustrated in FIG. 9, the first left lower frame 71L is disposed lower than the main frame 22 when the left rear wheel 9L does not bounce up and down.

As illustrated in FIG. 6, the right lower arm 70R preferably includes a first right lower frame 71R, a second right lower frame 72R, and a third right lower frame 73R. The first right lower frame 71R extends in the front-rear direction of the vehicle or substantially in the front-rear direction of the vehicle. The second right lower frame 72R extends obliquely leftward and forward from the front portion of the first right lower frame 71R. The third right lower frame 73R extends obliquely leftward and forward from the rear portion of the first right lower frame 71R. The second right lower frame 72R is disposed forward relative to the third right lower frame 73R. As illustrated in FIG. 4, the first right lower frame 71R is disposed lower than the main frame 22 when the right rear wheel 9R does not bounce up and down.

As illustrated in FIG. 6, the ROV 1 preferably further includes a second left front connector 75L, a second left rear connector 76L, a second right front connector 75R, and a second right rear connector 76R. The second left front connector 75L and the second left rear connector 76L are brackets provided on the left main subframe 22L. The second right front connector 75R and the second right rear connector 76R are brackets provided on the right main subframe 22R. The second left rear connector 76L is disposed rearward relative to the second left front connector 75L. The second right rear connector 76R is disposed rearward relative to the second right front connector 75R. The second left front connector 75L connects the left main subframe 22L and the second left lower frame 72L of the left lower arm 70L to each other. More specifically, the second left front connector 75L connects the first portion 22LA of the left main subframe 22L and the second left lower frame 72L of the left lower arm 70L to each other. The second left rear connector 76L connects the left main subframe 22L and the third left lower frame 73L of the left lower arm 70L to each other. More specifically, the second left rear connector 76L connects the third portion 22LC of the left main subframe 22L and the third left lower frame 73L of the left lower arm 70L to each other. The left lower arm 70L is rotatable with respect to the left main subframe 22L. The second right front connector 75R connects the right main subframe 22R and the second right lower frame 72R of the right lower arm 70R to each other. More specifically, the second right front connector 75R connects the first portion 22RA of the right main subframe 22R and the second right lower frame 72R of the right lower arm 70R to each other. The second right rear connector 76R connects the right main subframe 22R and the third right lower frame 73R of the right lower arm 70R to each other. More specifically, the second right rear connector 76R connects the third portion 22RC of the right main subframe 22R and the third right lower frame 73R of the right lower arm 70R to each other. The right lower arm 70R is rotatable with respect to the right main subframe 22R.

As illustrated in FIG. 3, the second left front connector 75L is disposed forward relative to the left rear wheel 9L. The second right front connector 75R is disposed forward relative to the right rear wheel 9R. The second left front connector 75L and the second right front connector 75R are disposed forward relative to the engine 14. As illustrated in FIG. 6, the second left rear connector 76L is located forward relative to the first left rear connector 66L. The second right rear connector 76R is located forward relative to the first right rear connector 66R. As illustrated in FIG. 8, in the rear view of the vehicle, the second left rear connector 76L is located outward of the first left rear connector 66L in the width direction of the vehicle. In other words, the second left rear connector 76L is located leftward relative to the first left rear connector 66L in the rear view of the vehicle. In the rear view of the vehicle, the second right rear connector 76R is located outward of the first right rear connector 66R in the width direction of the vehicle. In other words, the second right rear connector 76R is located rightward relative to the first right rear connector 66R in the rear view of the vehicle.

As illustrated in FIG. 6, a second left straight line L2 passes through the second left front connector 75L and the second left rear connector 76L. The second left straight line L2 inclines inward toward the widthwise center of the vehicle as it extends rearward in the bottom view of the vehicle. In other words, the second left straight line L2 inclines rightward as it extends rearward in the bottom view of the vehicle. The second left straight line L2 overlaps with the second portion 22LB of the left main subframe 22L in the bottom view of the vehicle. A second right straight line R2 passes through the second right front connector 75R and the second right rear connector 76R. The second right straight line R2 inclines inward toward the widthwise center of the vehicle as it extends rearward in the bottom view of the vehicle. In other words, the second right straight line R2 inclines leftward as it extends rearward in the bottom view of the vehicle. The second right straight line R2 overlaps with the second portion 22RB of the right main subframe 22R in the bottom view of the vehicle. The second left straight line L2 and the second right straight line R2 preferably intersect at a point rearward relative to the first rear subframe 42 in the bottom view of the vehicle.

As illustrated in FIG. 6, the ROV 1 preferably further includes a fourth left front connector 77L, a fourth left rear connector 78L, a fourth right front connector 77R, and a fourth right rear connector 78R. The fourth left rear connector 78L is disposed rearward relative to the fourth left front connector 77L. The fourth right rear connector 78R is disposed rearward relative to the fourth right front connector 77R. The fourth left front connector 77L connects the left rear wheel 9L and the first left lower frame 71L of the left lower arm 70L to each other. The fourth left rear connector 78L connects the left rear wheel 9L and the first left lower frame 71L of the left lower arm 70L to each other. The fourth right front connector 77R connects the right rear wheel 9R and the first right lower frame 71R of the right lower arm 70R to each other. The fourth right rear connector 78R connects the right rear wheel 9R and the first right lower frame 71R of the right lower arm 70R to each other.

As illustrated in FIG. 6, a fourth left straight line L4 passes through the fourth left front connector 77L and the fourth left rear connector 78L. The fourth left straight line L4 inclines inward toward the widthwise center of the vehicle as it extends rearward in the bottom view of the vehicle. In other words, the fourth left straight line L4 inclines rightward as it extends rearward in the bottom view of the vehicle. The fourth left straight line L4 is parallel or substantially parallel to the second left straight line L2. The fourth left straight line L4 is parallel or substantially parallel to the first left straight line L1 and the third left straight line L3. A fourth right straight line R4 passes through the fourth right front connector 77R and the fourth right rear connector 78R. The fourth right straight line R4 inclines inward toward the widthwise center of the vehicle as it extends rearward in the bottom view of the vehicle. In other words, the fourth right straight line R4 inclines leftward as it extends rearward in the bottom view of the vehicle. The fourth right straight line R4 is parallel or substantially parallel to the second right straight line R2. The fourth right straight line R4 is parallel or substantially parallel to the first right straight line R1 and the third right straight line R3. A distance ML between the second left straight line L2 and the fourth left straight line L4 is defined as an arm length of the left lower arm 70L. A distance MR between the second right straight line R2 and the fourth right straight line R4 is defined as an arm length of the right lower arm 70R.

As illustrated in FIG. 6, a central position or midpoint E1 between points mounting the left upper arm 60L is located rearward relative to a central position or midpoint E2 between points mounting the left lower arm 70L. More specifically, the central position E1 between the first left front connector 65L and the first left rear connector 66L in the front-rear direction of the vehicle is located rearward relative to the central position E2 between the second left front connector 75L and the second left rear connector 76L in the front-rear direction of the vehicle. A central position or midpoint F1 between points mounting the right upper arm 60R is located rearward relative to a central position or midpoint F2 between points mounting the right lower arm 70R. More specifically, the central position F1 between the first right front connector 65R and the first right rear connector 66R in the front-rear direction of the vehicle is located rearward relative to the central position F2 between the second right front connector 75R and the second right rear connector 76R in the front-rear direction of the vehicle.

As illustrated in FIG. 6, a distance G1 between the points mounting the left lower arm 70L is longer than a distance G2 between the points mounting the left upper arm 60L. More specifically, the distance G1 between the second left front connector 75L and the second left rear connector 76L in the front-rear direction of the vehicle is longer than the distance G2 between the first left front connector 65L and the first left rear connector 66L in the front-rear direction of the vehicle. A distance H1 between the points mounting the right lower arm 70R is longer than a distance H2 between the points mounting the right upper arm 60R. More specifically, the distance H1 between the second right front connector 75R and the second right rear connector 76R in the front-rear direction of the vehicle is longer than the distance H2 between the first right front connector 65R and the first right rear connector 66R in the front-rear direction of the vehicle.

As illustrated in FIG. 8, the ROV 1 preferably further includes a left shock absorber 80L and a right shock absorber 80R. The left shock absorber 80L is connected to the third connection subframe 52, and to the third left lower frame 73L of the left lower arm 70L. The right shock absorber 80R is connected to the third connection subframe 52, and to the third right lower frame 73R of the right lower arm 70R. The left shock absorber 80L is connected to the third left lower frame 73L of the left lower arm 70L at a position rearward relative to the left axle 12L. The right shock absorber 80R is connected to the third right lower frame 73R of the right lower arm 70R at a position rearward relative to the right axle 12R. The left shock absorber 80L may alternatively be connected to the third connection subframe 52 and the left upper arm 60L. The right shock absorber 80R may alternatively be connected to the third connection subframe 52 and the right upper arm 60R. As illustrated in FIG. 6, the left shock absorber 80L is disposed inward of the left upper arm 60L. The right shock absorber 80R is disposed inward of the right upper arm 60R. The left shock absorber 80L is disposed rearward relative to the second left upper frame 62L in the bottom view of the vehicle. The right shock absorber 80R is disposed rearward relative to the second right upper frame 62R in the bottom view of the vehicle.

As illustrated in FIG. 8, the left shock absorber 80L preferably includes a first upper end portion 80LA. The right shock absorber 80R preferably includes a second upper end portion 80RA. The first upper end portion 80LA is connected to the third connection subframe 52. The second upper end portion 80RA is connected to the third connection subframe 52. As illustrated in FIG. 4, the first upper end portion 80LA is disposed between the first upper connection 47L and the second upper connection 47R in the rear view of the vehicle. The second upper end portion 80RA is disposed between the first upper connection 47L and the second upper connection 47R in the rear view of the vehicle. As illustrated in FIG. 3, the first upper end portion 80LA of the left shock absorber 80L and the second upper end portion 80RA of the right shock absorber 80R are disposed inward relative to the first auxiliary frame portion 44L and the second auxiliary frame portion 44R in the width direction of the vehicle. The first upper end portion 80LA is disposed rightward relative to the first auxiliary frame portion 44L. The second upper end portion 80RA is disposed leftward relative to the second auxiliary frame portion 44R.

As illustrated in FIG. 4, the first upper end portion 80LA is disposed rightward relative to the first left front connector 65L in the rear view of the vehicle. The first upper end portion 80LA may alternatively be disposed rightward relative to the first left rear connector 66L in the rear view of the vehicle. The second upper end portion 80RA is disposed leftward relative to the first right front connector 65R in the rear view of the vehicle. The second upper end portion 80RA may alternatively be disposed leftward relative to the first right rear connector 66R in the rear view of the vehicle.

As illustrated in FIG. 1, the ROV 1 preferably further includes an exhaust system 16 through which exhaust gas discharged from the engine 14 flows, and a muffler 17. The exhaust system 16 is connected to the engine 14. The exhaust system 16 preferably includes a first exhaust pipe 14A, a second exhaust pipe 14B, and a third exhaust pipe 14C. The exhaust pipes 14A, 14B, and 14C are each in communication with the engine 14. The exhaust pipes 14A to 14C are combined at their rear end portions into a pipe 14Z. The muffler 17 is connected to the rear end portion of the pipe 14Z.

As illustrated in FIG. 1, the muffler 17 is disposed behind the engine 14. As illustrated in FIG. 3, the muffler 17 is disposed on the vehicle center line C. As used herein, the term "vehicle center line C" refers to a line extending in the front-rear direction of the vehicle to pass through the widthwise center of the vehicle, including the midpoint between the left front wheel 7L (see FIG. 1) and the right front wheel (not illustrated) and the midpoint between the left rear wheel 9L and the right rear wheel 9R, in a plan view of the vehicle. The muffler 17 overlaps with the first upper end portion 80LA of the left shock absorber 80L and the second upper end portion 80RA of the right shock absorber 80R in the plan view of the vehicle. As illustrated in FIG. 4, the muffler 17 is disposed between the left shock absorber 80L and the right shock absorber 80R. The muffler 17 is disposed rightward relative to the left shock absorber 80L. The muffler 17 is disposed leftward relative to the right shock absorber 80R. The muffler 17 is disposed between the left pipe frame portion 46L and the right pipe frame portion 46R in the rear view of the vehicle. The muffler 17 is disposed rightward relative to the left pipe frame portion 46L in the rear view of the vehicle. The muffler 17 is disposed leftward relative to the right pipe frame portion 46R in the rear view of the vehicle.

As illustrated in FIG. 6, the first and second left straight lines L1 and L2 of the ROV 1 incline rightward toward the widthwise center of the vehicle as they extend toward the rear of the ROV 1 as previously mentioned. The first and second right straight lines R1 and R2 incline leftward toward the widthwise center of the vehicle as they extend toward the rear of the ROV 1. This makes it possible to increase the arm lengths of the right and left upper arms 60R and 60L and the right and left lower arms 70R and 70L without having to increase the widthwise length of the ROV 1. Consequently, the right and left shock absorbers 80R and 80L have longer strokes and thus offer enhanced shock-absorbing performance. The first left front connector 65L is disposed leftward relative to the first left rear connector 66L in the width direction of the vehicle, the first right front connector 65R is disposed rightward relative to the first right rear connector 66R in the width direction of the vehicle, the second left front connector 75L is disposed leftward relative to the second left rear connector 76L in the width direction of the vehicle, and the second right front connector 75R is disposed rightward relative to the second right rear connector 76R in the width direction of the vehicle. This arrangement increases the layout flexibility of, for example, the engine 14 which is at least partially located inward of the first left front connector 65L, the first right front connector 65R, the second left front connector 75L, and the second right front connector 75R in the width direction of the vehicle. The central position E1 between the first left front connector 65L and the first left rear connector 66L in the front-rear direction of the vehicle is located rearward relative to the central position E2 between the second left front connector 75L and the second left rear connector 76L in the front-rear direction of the vehicle, and the central position F1 between the first right front connector 65R and the first right rear connector 66R in the front-rear direction of the vehicle is located rearward relative to the central position F2 between the second right front connector 75R and the second right rear connector 76R in the front-rear direction of the vehicle. This increases the layout flexibility of the connectors 65L, 66L, 75L, and 76L and the connectors 65R, 66R, 75R, and 76R, thus increasing the flexibility of mounting positions of the right and left upper arms 60R and 60L and the right and left lower arms 70R and 70L.

As illustrated in FIG. 6, the ROV 1 according to the present preferred embodiment includes the second left front connector 75L connecting the first portion 22LA and the left lower arm 70L to each other, the second left rear connector 76L connecting the third portion 22LC and the left lower arm 70L to each other, the second right front connector 75R connecting the first portion 22RA and the right lower arm 70R to each other, and the second right rear connector 76R connecting the third portion 22RC and the right lower arm 70R to each other. This makes it possible to increase the arm lengths of the right and left lower arms 70R and 70L without having to increase the widthwise length of the ROV 1. Furthermore, the space inward of the main frame 22 in the width direction of the vehicle is larger than when the main frame 22 inclines inward toward the widthwise center of the vehicle as it extends rearward.

As illustrated in FIG. 6, the engine 14 of the ROV 1 according to the present preferred embodiment is disposed forward relative to the third portions 22LC and 22RC. This increases the layout flexibility of the engine 14.

As illustrated in FIG. 6, the second left front connector 75L of the ROV 1 according to the present preferred embodiment is disposed forward relative to the left rear wheel 9L, and the second right front connector 75R of the ROV 1 according to the present preferred embodiment is disposed forward relative to the right rear wheel 9R. This increases the front-rear distance G1 between the points of mounting of the left lower arm 70L, and the front-rear distance H1 between the points of mounting of the right lower arm 70R. Consequently, the right and left shock absorbers 80R and 80L have greater rigidity.

As illustrated in FIG. 6, the ROV 1 according to the present preferred embodiment includes the first lower connection 48L through which the left main subframe 22L and the left pipe frame portion 46L are connected to each other, and the second lower connection 48R through which the right main subframe 22R and the right pipe frame portion 46R are connected to each other. The first and second lower connections 48L and 48R are located forward relative to the rear end 42BB of the first rear subframe 42. This provides sufficient clearance between the rear of the ROV 1 and the ground.

As illustrated in FIG. 6, the ROV 1 according to the present preferred embodiment preferably is configured so that the front-rear distance G1 between the second left front connector 75L and the second left rear connector 76L is longer than the front-rear distance G2 between the first left front connector 65L and the first left rear connector 66L, and the front-rear distance H1 between the second right front connector 75R and the second right rear connector 76R is longer than the front-rear distance H2 between the first right front connector 65R and the first right rear connector 66R. Since the front-rear distance G1 between the points of mounting of the left lower arm 70L, and the front-rear distance H1 between the points of mounting of the right lower arm 70R are longer, the right and left shock absorbers 80R and 80L have greater rigidity.

As illustrated in FIG. 6, the ROV 1 according to the present preferred embodiment preferably is configured so that the third left straight line L3 is parallel or substantially parallel to the first left straight line L1, the fourth left straight line L4 is parallel or substantially parallel to the second left straight line L2, the third right straight line R3 is parallel or substantially parallel to the first right straight line R1, and the fourth right straight line R4 is parallel or substantially parallel to the second right straight line R2. This configuration allows appropriate distances to be maintained between the first left rear connector 66L and the third left rear connector 68L and between the first right rear connector 66R and the third right rear connector 68R, while enabling the right and left upper arms 60R and 60L to have long arm lengths. This configuration also allows appropriate distances to be maintained between the second left rear connector 76L and the fourth left rear connector 78L and between the second right rear connector 76R and the fourth right rear connector 78R, while enabling the right and left lower arms 70R and 70L to have long arm lengths.

The terms and expressions that have been employed are used as terms of description and not of limitation, and there is no intention, in the use of such terms and expressions, of excluding any equivalents of the features shown and described or portions thereof, but it is recognized that various modifications are possible within the scope of the claimed invention. While the present invention may be embodied in many different forms, a number of illustrative preferred embodiments are described herein with the understanding that the present disclosure is to be considered as providing examples of the principles of the present invention and that such examples are not intended to limit the present invention to the preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame;
   a rear wheel;
   an upper arm connected to the body frame, the upper arm supporting the rear wheel;
   a lower arm disposed lower than the upper arm and connected to the body frame, the lower arm supporting the rear wheel;
   a shock absorber connected to the body frame and to the lower arm or to the upper arm;
   a first front connector connecting the upper arm and the body frame to each other;
   a first rear connector disposed rearward of the first front connector and inward of the first front connector in a width direction of the vehicle, the first rear connector connecting the upper arm and the body frame to each other;
   a second front connector connecting the lower arm and the body frame to each other; and
   a second rear connector disposed rearward of the second front connector and inward of the second front connector in the width direction of the vehicle, the second rear connector connecting the lower arm and the body frame to each other; wherein
   a first straight line passing through the first front connector and the first rear connector inclines inward toward a widthwise center of the vehicle as the first straight line extends rearward in a bottom view of the vehicle;
   a second straight line passing through the second front connector and the second rear connector inclines inward toward the widthwise center of the vehicle as the second straight line extends rearward in the bottom view of the vehicle; and
   a midpoint between the first front connector and the first rear connector in a front-rear direction of the vehicle is located rearward of a midpoint between the second front connector and the second rear connector in the front-rear direction of the vehicle.

2. The vehicle according to claim 1, wherein the body frame includes:
   an upper frame; and
   a lower frame disposed lower than the upper frame;
   the lower frame includes:
     a first portion extending in the front-rear direction of the vehicle;

a second portion extending rearward from the first portion and inward toward the widthwise center of the vehicle; and
a third portion extending rearward from the second portion;
the second front connector connects the first portion and the lower arm to each other; and
the second rear connector connects the third portion and the lower arm to each other.

3. The vehicle according to claim 2, further comprising an engine supported by the body frame, the engine being disposed forward of the third portion.

4. The vehicle according to claim 2, wherein the second straight line overlaps with the second portion of the lower frame in the bottom view of the vehicle.

5. The vehicle according to claim 1, wherein the second front connector is disposed forward of the rear wheel.

6. The vehicle according to claim 1, wherein the body frame includes:
an upper frame;
a lower frame disposed lower than the upper frame;
a connection frame extending obliquely upward and rearward from the lower frame and connected to the upper frame; and
a connection through which the lower frame and the connection frame are connected to each other; and
the connection is located forward of a rear end of the upper frame.

7. The vehicle according to claim 1, wherein the shock absorber is connected to the lower arm, and a distance between the second front connector and the second rear connector in the front-rear direction of the vehicle is longer than a distance between the first front connector and the first rear connector in the front-rear direction of the vehicle.

8. The vehicle according to claim 1, wherein the second rear connector is disposed outward of the first rear connector in the width direction of the vehicle in a rear view of the vehicle.

9. The vehicle according to claim 1, further comprising:
a third front connector connecting the upper arm and the rear wheel to each other;
a third rear connector disposed rearward of the third front connector and inward of the third front connector in the width direction of the vehicle, the third rear connector connecting the upper arm and the rear wheel to each other;
a fourth front connector connecting the lower arm and the rear wheel to each other; and
a fourth rear connector disposed rearward of the fourth front connector and inward of the fourth front connector in the width direction of the vehicle, the fourth rear connector connecting the lower arm and the rear wheel to each other; wherein
a third straight line passing through the third front connector and the third rear connector is parallel or substantially parallel to the first straight line; and
a fourth straight line passing through the fourth front connector and the fourth rear connector is parallel or substantially parallel to the second straight line.

10. A vehicle comprising:
a body frame;
a rear wheel;
an upper arm connected to the body frame, the upper arm supporting the rear wheel;
a lower arm disposed lower than the upper arm and connected to the body frame, the lower arm supporting the rear wheel;
a shock absorber connected to the body frame and to the lower arm;
a front connector connecting the lower arm and the body frame to each other; and
a rear connector disposed rearward of the front connector and inward of the front connector in a width direction of the vehicle, the rear connector connecting the lower arm and the body frame to each other; wherein
a straight line passing through the front connector and the rear connector inclines inward toward a widthwise center of the vehicle as the straight line extends rearward in a bottom view of the vehicle; and
the front connector is disposed forward of a forwardmost portion of the upper arm in a side view of the vehicle.

11. The vehicle according to claim 10, wherein the body frame includes:
an upper frame; and
a lower frame disposed lower than the upper frame;
the lower frame includes:
a first portion extending in a front-rear direction of the vehicle;
a second portion extending rearward from the first portion and inward toward the widthwise center of the vehicle; and
a third portion extending rearward from the second portion;
the front connector connects the first portion and the lower arm to each other; and
the rear connector connects the third portion and the lower arm to each other.

12. The vehicle according to claim 11, further comprising an engine supported by the body frame, the engine being disposed forward of the third portion.

13. The vehicle according to claim 11, wherein the straight line overlaps with the second portion of the lower frame in the bottom view of the vehicle.

14. The vehicle according to claim 10, wherein the body frame includes:
an upper frame;
a lower frame disposed lower than the upper frame; and
a connection frame extending obliquely upward and rearward from the lower frame and connected to the upper frame; and
the upper frame and the lower frame each include a rear end, the rear end of the lower frame being located forward of the rear end of the upper frame.

15. The vehicle according to claim 10, further comprising:
an additional front connector connecting the lower arm and the rear wheel to each other; and
an additional rear connector disposed rearward of the additional front connector and inward relative to the additional front connector in the width direction of the vehicle, the additional rear connector connecting the lower arm and the rear wheel to each other; wherein
an additional straight line passing through the additional front connector and the additional rear connector is parallel or substantially parallel to the straight line.

* * * * *